United States Patent
Stephens

(10) Patent No.: US 7,112,283 B2
(45) Date of Patent: Sep. 26, 2006

(54) METHOD AND SYSTEM FOR PROCESSING WASTE

(75) Inventor: Thomas C. Stephens, Lawrenceville, GA (US)

(73) Assignee: Nicolon Corporation, Pendergrass, GA (US)

(*) Notice: Subject to any disclaimer, the term of this patent is extended or adjusted under 35 U.S.C. 154(b) by 141 days.

(21) Appl. No.: 10/649,479

(22) Filed: Aug. 26, 2003

(65) Prior Publication Data

US 2004/0112837 A1 Jun. 17, 2004

Related U.S. Application Data

(63) Continuation-in-part of application No. PCT/US02/05899, filed on Feb. 26, 2002.

(60) Provisional application No. 60/271,853, filed on Feb. 27, 2001.

(51) Int. Cl.
B01D 29/11 (2006.01)

(52) U.S. Cl. .................. 210/728; 210/747; 210/767; 210/170; 210/461; 210/257.1

(58) Field of Classification Search ............ 210/723, 210/727, 728, 747, 767, 170, 196, 253, 257.1, 210/459, 460, 461, 473, 486, 489
See application file for complete search history.

(56) References Cited

U.S. PATENT DOCUMENTS

| | | | | |
|---|---|---|---|---|
| 3,875,319 A | * | 4/1975 | Seckler et al. ............. 210/787 |
| 4,338,337 A | * | 7/1982 | Frankl ..................... 210/769 |
| 4,501,665 A | * | 2/1985 | Wilhelmson ............... 210/170 |
| 4,664,798 A | * | 5/1987 | Bergh ...................... 210/253 |
| 4,882,069 A | * | 11/1989 | Pohoreski ................. 210/728 |
| 5,006,639 A | * | 4/1991 | Tono et al. ............... 210/728 |
| 5,810,510 A | * | 9/1998 | Urriola .................... 210/170 |
| 5,851,930 A | * | 12/1998 | Bessey et al. ............. 442/60 |
| 5,906,750 A | * | 5/1999 | Haase ...................... 210/727 |
| 5,985,157 A | * | 11/1999 | Leckner et al. ............ 210/747 |
| 6,083,386 A | * | 7/2000 | Lloyd .................... 210/257.1 |
| 6,186,701 B1 | | 2/2001 | Kempers |
| 6,334,953 B1 | * | 1/2002 | Singleton ................. 210/460 |
| 6,403,196 B1 | * | 6/2002 | Bessey et al. ............. 428/166 |
| 6,835,314 B1 | * | 12/2004 | Keller et al. .............. 210/747 |
| 2003/0045192 A1 | * | 3/2003 | Midkiff et al. ............. 442/103 |
| 2003/0136719 A1 | * | 7/2003 | Allard ..................... 210/459 |

FOREIGN PATENT DOCUMENTS

WO  WO 97/292246  8/1997

* cited by examiner

*Primary Examiner*—Christopher Upton
(74) *Attorney, Agent, or Firm*—Kilpatrick Stockton LLP

(57) ABSTRACT

A method and system of processing animal waste, whereby liquid is removed from the waste and recycled for use in other applications. Moreover, use of the method and system facilitates capture of the solid waste, which may then be used as fertilizer. In the present method and system, waste sludge is fed into a geotextile container, which functions as a filter. The liquid from the sludge permeates the geotextile container, while the geotextile container retains the solid waste. Multiple geotextile containers may be used to further filter and clean the liquid. The liquid exiting the geotextile container flows into a liquid reservoir, from which the liquid may be drawn for use in other applications. During this process, the solid waste is trapped in the geotextile container, where it will digest and compost and may be easily accessed for use as fertilizer or other nutrients.

24 Claims, 3 Drawing Sheets

METHOD AND SYSTEM FOR PROCESSING WASTE

RELATED APPLICATION

This application is a continuation-in-part of PCT International Application Number US02/05899 filed on Feb. 26, 2002 and published on Sep. 6, 2003 under publication number WO 02/068086, and claims priority to U.S. Provisional Application Ser. No. 60/271,853 filed on Feb. 27, 2001, all of which are incorporated by reference,

FIELD OF THE INVENTION

This invention relates to method and system for processing animal waste.

BACKGROUND OF THE INVENTION

Currently, the processing of animal waste is a time-consuming, not to mention smelly, process. Waste is fed through a pipe into a collection pond. The pond must be large enough to accommodate the waste produced, which, depending on the type and number of animals, can be considerable and therefore require a pond that occupies a significant amount of land. Once in the pond, the waste is digested or semi-digested, and the solid waste ultimately settles to the bottom of the pond. As one would expect, the odor emanating from the pond can be both noxious and a nuisance to others.

Because the waste contains valuable nutrients desirable for use as a fertilizer, great lengths are taken and significant monies expended to recapture the solid waste. While in the pond, the waste begins to digest, transforming the waste into a potential nutrient source. This process takes a considerable amount of time, after which the waste must then be pumped out of the pond in order to be used as fertilizer or other nutrients. Not surprisingly, a large amount of the waste is unable to be recaptured and therefore the value of the waste is lost.

SUMMARY OF THE INVENTION

The present invention provides a method and system of processing animal waste, whereby liquid is removed from the waste and recycled for use in other applications. Moreover, use of the method and system facilitates capture of the solid waste, which may then be used as fertilizer or other nutrients.

In the present method and system, waste sludge is fed into a geotextile container, which functions as a filter. The liquid from the sludge permeates the geotextile container, while the geotextile container retains the solid waste. Multiple geotextile containers may be used to further filter and clean the liquid. The liquid exiting the geotextile container flows into a reservoir, from which the liquid may be drawn for use in other applications.

During this process, the solid waste is trapped in the geotextile container, where it will digest and may be easily accessed for use as fertilizer or other nutrients. Use of geotextile containers thereby obviates the expensive and time-consuming process of extracting the waste from the collection pond. Moreover, geotextile containers are significantly more effective in capturing the solid waste, thereby reducing the loss of waste and the benefits derived therefrom. Because the geotextile container helps contain the odor of the waste, the method and system of the present invention reduces the impact waste processing has on others. All of these benefits are achieved by using geotextile containers that occupy only a small fraction of the land typically required for processing waste using a collection pond, thereby facilitating the permit process.

It is an object of the present invention to provide a method and system of recycling liquid from animal waste.

It is a further object of the present invention to provide a method and system of capturing animal waste for use in later applications.

It is yet another object of the present invention to reduce the volume of waste by removing high percentages of liquid content.

DETAILED DESCRIPTION OF THE DRAWINGS

Figure 1:
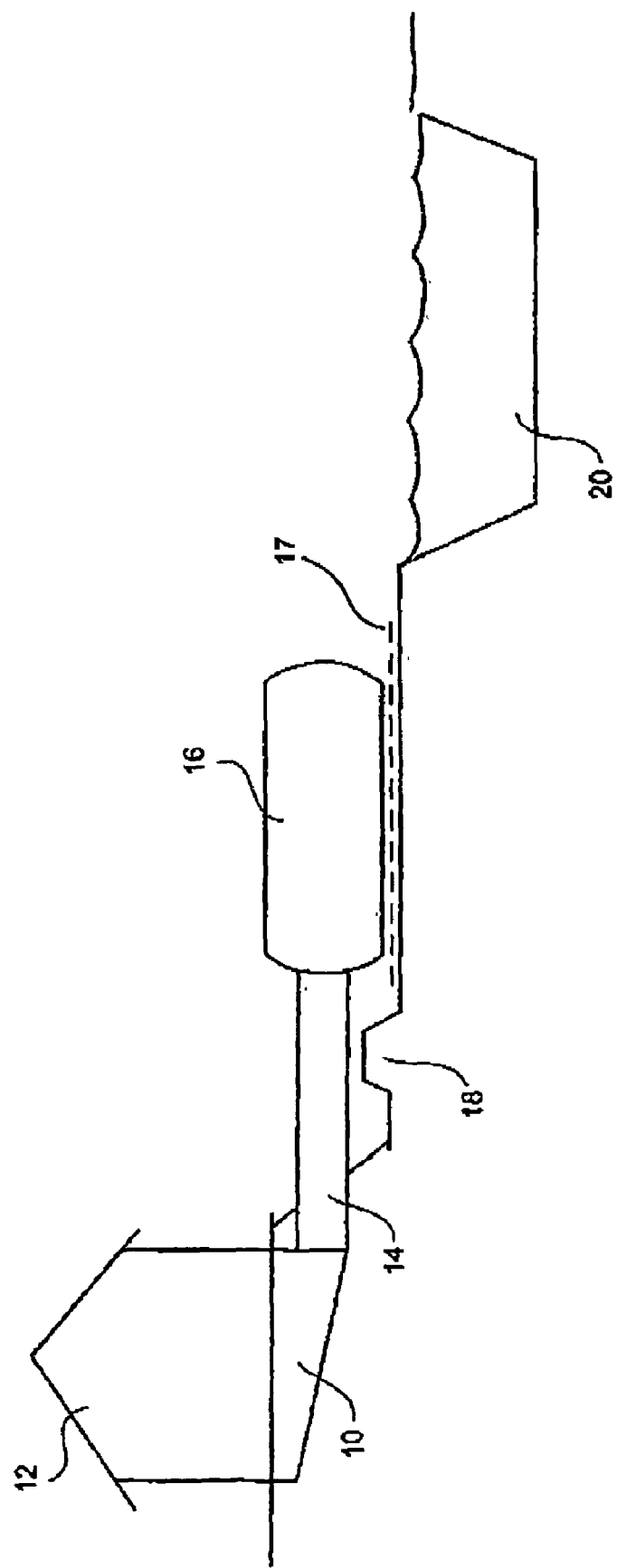
FIG. 1 illustrates an embodiment of the system of the present invention.

FIG. 1 illustrates an embodiment of the system of the present invention used in connection with processing of hog waste. The system and method of the present invention, however, may be used in connection with processing the waste of any type of animal, including livestock, poultry, and dairy, and is not limited to hog waste.

The system includes a waste reservoir 10 filled with a combination of liquid and hog waste ("waste sludge"). In the embodiment shown in FIG. 1, the waste reservoir 10 may be, but does not have to be, located under a hog barn 12 so that waste accumulated in the barn 12 may simply be swept or raked through a hole or other opening in the hog barn floor or, if the barn 12 has slatted floors, may fall through the floor and directly into the waste reservoir 10 located underneath the barn 12. Alternatively, the hog barn floor may be sloped to collect the waste sludge at a desired location in the hog barn 12.

From the waste reservoir 10, the waste sludge is transported through a primary connector, such as primary discharge pipe 14, into a primary geotextile container 16. As shown in FIG. 1, the waste reservoir 10 is preferably, but does not have to be, sloped or angled so that, by virtue of gravitational pull, the waste sludge is fed into the primary discharge pipe 14. Other means, however, for example mechanical means such as pumps, may be used to direct the waste sludge into and through the primary discharge pipe 14. The waste reservoir 10 is preferably emptied in this manner every 8 to 12 days, but discharge of the waste may occur more or less frequently, or even continuously. One skilled in the art would readily understand that one or more flow regulators, such as a valve or other means (not shown), may be used to control the flow of waste sludge into the primary geotextile container 16.

The geotextile containers discussed herein are preferably made from a material possessing suitable physical properties including structural integrity, liquid permeability, and adequate strength. A fabric, preferably a high strength woven or knitted polyester, polypropylene, or polyethylene fabric, is particularly useful in this application. U.S. Pat. No. 6,186,701, the entirety of which is incorporated herein by this reference, discloses a container, sold under the trademark Geotube®, that is well-suited for use in the present invention, although the disclosure and claims contained herein are in no way intended to be limited to the container disclosed in U.S. Pat. No. 6,186,701.

Once in the primary geotextile container 16, the liquid from the waste sludge permeates the walls of the primary geotextile container 16 while the solid waste is contained within the primary geotextile container 16. The geotextile container 16 is self-supporting, and therefore while additional supporting structure, either external or internal can be used, it is not necessary. The liquid exiting the primary geotextile container 16 is thereby filtered, separating the solid (including, but not limited to, suspended solids and dissolved solids) from the liquid. The primary geotextile container 16 may, but does not have to be, lined with a second fabric, such as a woven or nonwoven polyester, polypropylene, or polyethylene fabric, to further facilitate retention of the solid waste within the geotextile container 16. When the primary geotextile container 16 is filled to capacity, it may be emptied and reused again or may simply be replaced.

To facilitate collection of the filtered liquid exiting the primary geotextile container 16, a baffler, such as a berm 18, preferably extends around the periphery of the primary geotextile container 16. A substantially liquid impermeable liner (not shown) may be positioned under the primary geotextile container 16 and over the berm 18. A three-dimensional drainage net, mat, or core 17 may also be positioned between the liner and the geotextile container to facilitate 360 permeability. The liner prevents the filtered liquid exiting the primary geotextile container 16 from absorbing into the ground, while the berm 18 prevents the filtered liquid from escaping outside the area defined by the berm 18. As shown in FIG. 1, a liquid reservoir 20 is located substantially adjacent to the primary geotextile container 16. The filtered liquid contained within the area runs into the liquid reservoir 20. The liquid in the liquid reservoir 20, substantially free of solid waste, is then suitable for use in other applications, such as cleaning the hog barn 12. In experiments, the method and system of the invention has been shown to remove between 45 and 90% of the solid waste from waste sludge.

Figure 2:
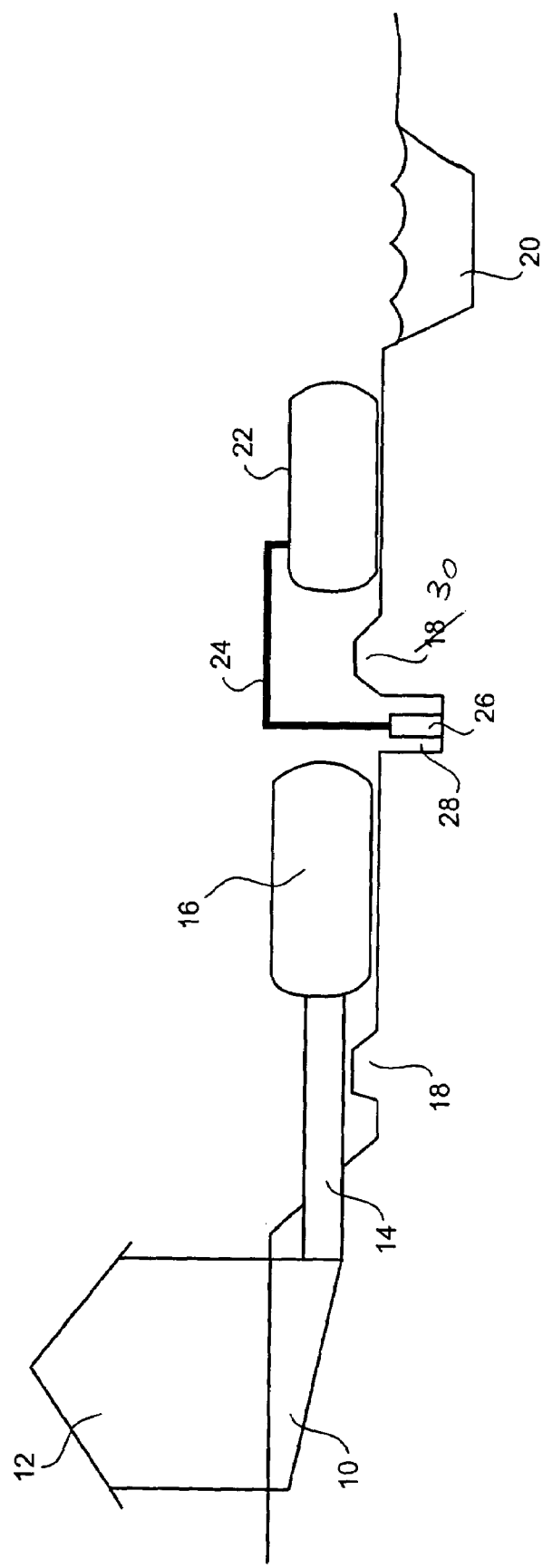
FIG. 2 illustrates an alternative embodiment of the system of the present invention.

Any number or configurations of geotextile containers can be used in this application. For example, in an alternative embodiment illustrated in FIG. 2, a secondary geotextile container 22 may be used to further filter and clean the liquid exiting the primary geotextile container 16. Liquid exiting the primary geotextile container 16 ("once-filtered liquid") is subsequently fed into the secondary geotextile container 22. FIG. 2 illustrates use of a sump pump 26 for this purpose. The once-filtered liquid flows into a sump 28. A sump pump 26 thereafter pumps the once-filtered liquid through a secondary connector, such as a secondary discharge pipe 24, and into the secondary geotextile container 22. Any means of feeding the once-filtered liquid into the secondary geotextile container 22 may be used, however, including, but not limited to, gravitational flow, siphoning, etc. Additionally, one or more flow regulators, such as a valve or other means, may be used to control the flow of the once-filtered liquid into the secondary geotextile container 22. The secondary geotextile container 22 serves to further filter the liquid. A second barrier, such as a berm 30, preferably extends around the periphery of the secondary geotextile container 22. The liquid exiting the secondary geotextile container 22 flows into the adjacent liquid reservoir 20, where it can be removed for use in a number of applications.

Figure 3:
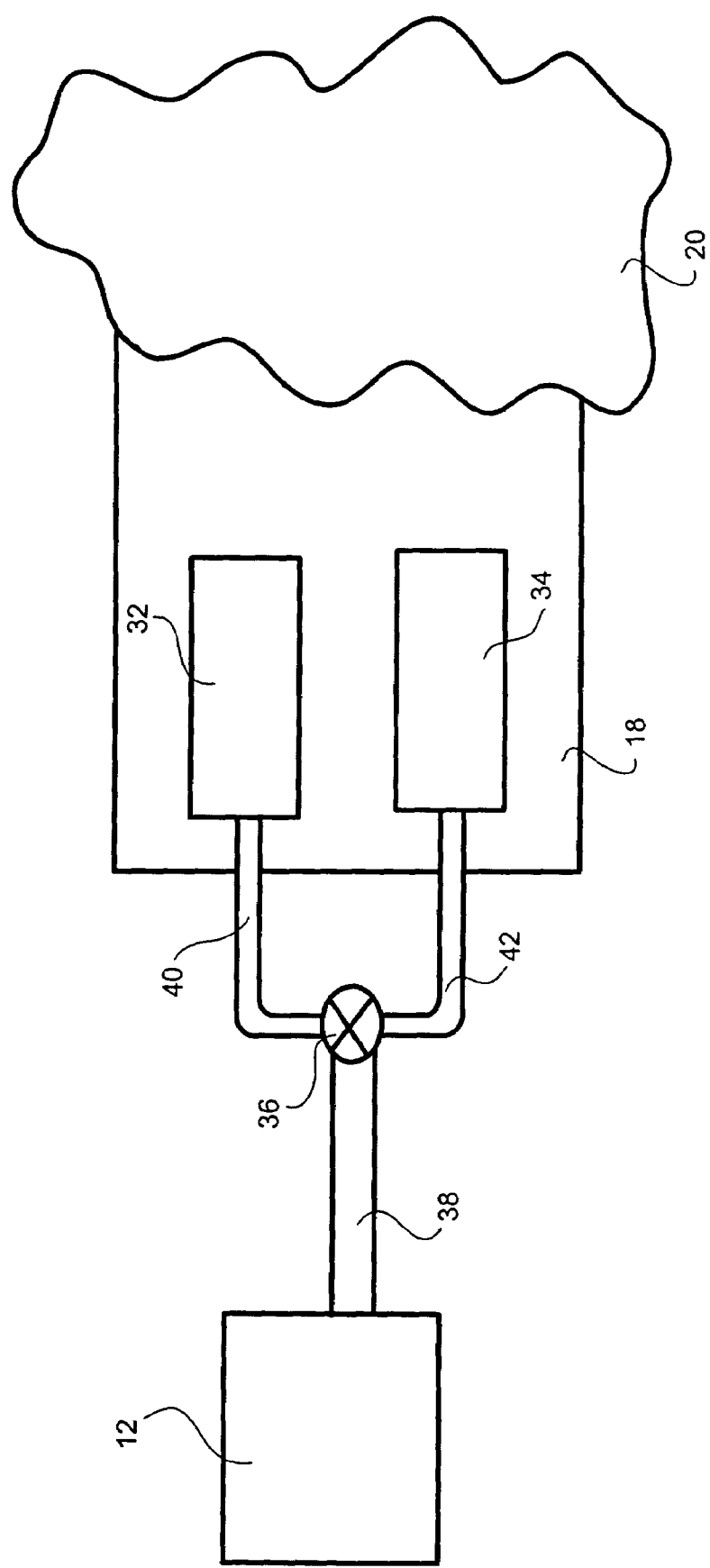
FIG. 3 illustrates yet another alternative embodiment of the system of the present invention.

FIG. 3 illustrates yet another embodiment of the system of the present invention whereby waste sludge can be pumped simultaneously into multiple geotextile containers 32, 34. As shown in FIG. 3, a flow regulator, such as a valve 36, may positioned at the end of the primary discharge pipe 38, to which secondary discharge pipes 40, 42 leading to the geotextile containers 32, 34 are attached. The valve 36 may be adjusted to allow waste sludge to flow simultaneously into both geotextile containers 32, 34. Additionally, the valve 36 may be adjusted to cut off flow of the sludge to one or more of the geotextile containers 32, 34. Each secondary discharge pipe 40, 42 may also be equipped with its own flow regulator (not shown) to control flow into its respective geotextile container 32, 34. While only two geotextile containers 32, 34 are shown in FIG. 3, one skilled in the art will understand that a manifold system may be used to simultaneously fill any number of geotextile containers.

In another embodiment, the waste sludge is conditioned with chemical conditioners to enhance the separation of the solid waste. A variety of chemical conditioners may be used, including, but not limited to, ferric chloride, ferric sulfate and aluminum sulfate. The chemical conditioners homogenize the solid waste so that substantially all the solid waste particles carry the same charge. At least one polymer with the opposite charge is then introduced into the waste sludge. Examples of polymers that may be used in the invention include, but are not limited to, polyacrylamide cationic and polyacrylamide anionic. The oppositely charged polymer causes the solid waste to effectively coagulate and precipitate from the solution. The chemical conditioners and polymer are introduced into the waste sludge before the waste sludge enters the primary geotextile container 16. The coagulation of the solid waste significantly improves the geotextile containers ability to capture the solid waste and greatly improves dewatering. This results in a higher percentage of valuable nutrients that can be used as fertilizer and a liquid effluent that is less likely to cause environmental impact due to solid waste content. A further advantage is found in the reduced water content of the solid waste, which can be more easily transported to land at a greater distance from the dewatering system.

The foregoing is provided for purposes of illustrating, explaining, and describing embodiments of the present invention. Further modifications and adaptations to these embodiments will be apparent to those skilled in the art and may be made without departing from the scope or spirit of the invention.

I claim:

1. A system for processing waste comprising:
   a. a waste sludge comprising solid waste and liquid;
   b. at least one geotextile container positioned aboveground for filtering at least some of the liquid from the waste sludge;
   c. at least one connector for transporting the waste sludge into the at least one geotextile container; and
   d. a liquid reservoir for collecting the liquid filtered from the at least one geotextile container.

2. The system of claim 1, wherein the system further comprises a waste reservoir for collecting the waste sludge and wherein the at least one connector transports the waste sludge from the waste reservoir and into the at least one geotextile container.

3. The system of claim 1, wherein the at least one connector comprises a pipe.

4. The system of claim 1, further comprising at least one regulator for controlling flow of the waste sludge into the at least one geotextile container.

5. The system of claim 4, wherein the at least one regulator comprises a valve.

6. The system of claim 1, wherein the at least one geotextile container comprises an at least partially liquid permeable material.

7. The system of claim 1, wherein the material comprises fabric.

8. The system of claim 6, wherein the at least one geotextile container comprises an inner layer and an outer layer of material.

9. The system of claim 1, further comprising a barrier defining an area in which the at least one geotextile container may be positioned.

10. The system of claim 1, further comprising a liner positioned under the at least one geotextile container.

11. The system of claim 1, further comprising a three-dimensional drainage net positioned under the at least one geotextile container.

12. The system of claim 1, wherein the liquid reservoir is positioned substantially adjacent to the at least one geotextile container.

13. The system of claim 1, wherein the at least one geotextile container comprises a primary geotextile container and a secondary geotextile container and the at least one connector comprises a primary connector and a secondary connector, wherein the primary connector transports waste sludge into the primary geotextile container and wherein the secondary connector transports liquid filtered by the primary geotextile container into the secondary geotextile container.

14. The system of claim 1, wherein the at least one geotextile container comprises at least two geotextile containers, wherein the system is adapted to simultaneously feed the waste sludge into the at least two geotextile containers.

15. The system of claim 1, further comprising:
at least one chemical conditioner for imparting a charge to a portion of the solid waste in the waste sludge;
at least one polymer carrying an opposite charge to that imparted by the at least one chemical conditioner to aid in coagulation of the solid waste in the waste sludge.

16. A method of processing waste comprising:
a. feeding waste sludge comprising solid waste and liquid into at least one geotextile container positioned above-around;
b. removing at least some of the liquid from the waste sludge using the at least one geotextile container; and
c. collecting the liquid removed from the waste sludge.

17. The method of claim 16, wherein the waste sludge is fed into the at least one geotextile container through a connector.

18. The method of claim 16, wherein removing at least some of the liquid comprises allowing the liquid to permeate trough the geotextile container.

19. The method of claim 16, wherein the at least one geotextile container comprises a primary and a secondary geotextile container and the waste sludge is fed into the primary geotextile container, wherein the method further comprises feeding the collected liquid into the secondary geotextile container.

20. The method of claim 16, wherein the at least one geotextile container comprises at least two geotextile containers and the waste sludge is fed simultaneously into the at least two geotextile containers.

21. The method of claim 16, further comprising controlling flow of the waste sludge into the at least one geotextile container.

22. The method of claim 16, further comprising:
adding at least one chemical conditioner for imparting a charge to a portion of the solid waste in the waste sludge to the waste sludge before feeding the waste sludge into the at least one geotextile container;
adding at least one polymer carrying an opposite charge to that imparted by the at least one chemical conditioner to aid in coagulation of the solid waste in the waste sludge to the waste sludge before feeding the waste sludge into the at least one geotextile container.

23. A system of processing waste comprising:
a. a waste sludge comprising solid waste and liquid;
b. a waste reservoir for collecting the waste sludge;
c. at least one geotextile container positioned above ground for filtering at least some of the liquid from the waste sludge, wherein the at least one geotextile container comprises an at least partially liquid permeable material;
d. at least one pipe for transporting the waste sludge from the waste reservoir and into the at least one geotextile container; and
e. a liquid reservoir located substantially adjacent to the at least one geotextile container for collecting the liquid filtered from the at least one geotextile container.

24. A system for processing waste comprising:
a. a waste sludge comprising solid waste and liquid, wherein the waste sludge further comprises at least one chemical conditioner for imparting a charge to a portion of the solid waste in the waste sludge and at least one polymer carrying an opposite charge to that imparted by the at least one chemical conditioner to aid in coagulation of the solid waste in the waste sludge;
b. at least one geotextile container for filtering at least some of the liquid from the waste sludge;
c. at least one connector for transporting the waste sludge into the at least one geotextile container;
d. a liquid reservoir for collecting the liquid filtered from the at least one geotextile container; and
e. a three-dimensional drainage net positioned under the at least one geotextile container.

* * * * *